Nov. 18, 1969     F. M. PERRA     3,479,586
DYNAMIC IMPEDANCE ANALYZER INCLUDING MAGNITUDE
AND PHASE DISPLAYING MEANS
Filed Oct. 16, 1967     3 Sheets-Sheet 1

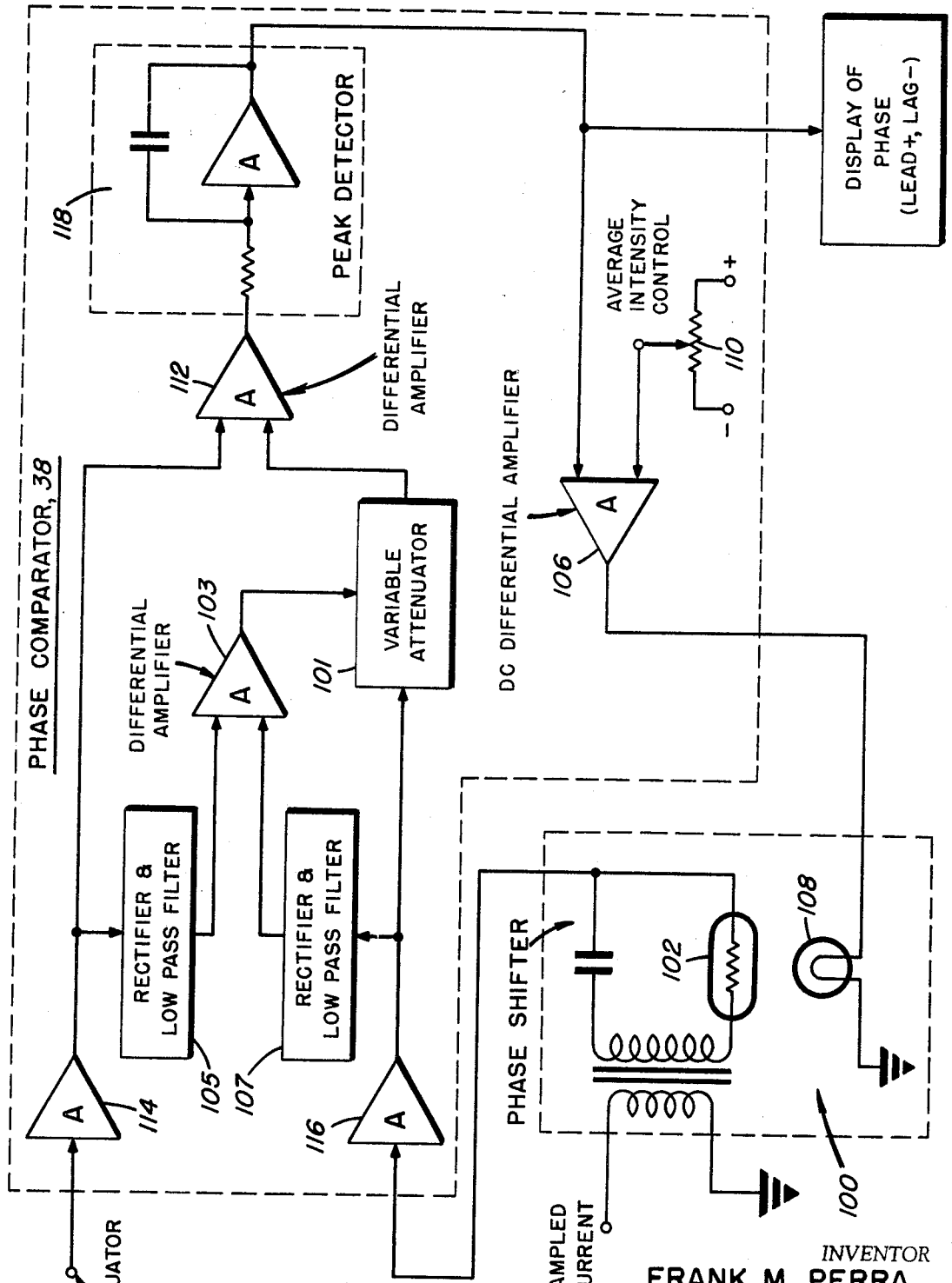

United States Patent Office 3,479,586
Patented Nov. 18, 1969

3,479,586
DYNAMIC IMPEDANCE ANALYZER INCLUDING MAGNITUDE AND PHASE DISPLAYING MEANS
Frank M. Perra, Laurel, Md., assignor to Halliburton Company, Duncan, Okla., a corporation of Delaware
Continuation-in-part of application Ser. No. 644,681, June 8, 1967. This application Oct. 16, 1967, Ser. No. 675,474
Int. Cl. G01r 27/00, 23/12
U.S. Cl. 324—57
10 Claims

ABSTRACT OF THE DISCLOSURE

A dynamic impedance analyzer for rapidly determining the impedance characteristics of line conditions or electrical elements without disturbing the operational line network including line voltage and current sampling probes feeding an analog divider, through a phase shifter control circuit, at zero phase to obtain a signal value representative of instantaneous V absolute/I absolute ratio and also feeding an impedance phase discriminator to obtain a signal value representative of phase between sampled V and I the sign (representing phase lag or lead) of which is obtained from an auxiliary output of the phase shifter.

REFERENCE TO OTHER APPLICATIONS

This is a continuation-in-part patent application of the pending patent application Ser. No. 644,681 filed June 8, 1967, now abandoned by Frank M. Perra, and bearing a common title and assignee.

BACKGROUND OF THE INVENTION

In monitoring electrical elements and components to determine their condition or status, it is conventional to employ devices which determine the impedance characteristics of the electrical elements and compare the measured impedance values with known standards in order to determine the necessary information. Much can be learned from this information including whether or not the element is operating satisfactorily and within acceptable tolerance limits.

Prior impedance monitoring devices employ many techniques including generating a test signal on the line and sensing and measuring this signal. Another technique is to operate directly off the line voltage and current to make the determination of impedance characteristics. In either case it has been necessary in the past to interrupt the system operation by breaking into the line connected to the element or line under test in order to measure its characteristics. Thus, with conventional impedance measuring devices, much time and labor are required and the element being examined is inoperable during the testing period. In addition, opening and reclosing the line for test purposes increases the chance of inadvertent damage to the element under test, the line, and possibly the system.

One example where such a conventional technique is employed is in oceanographic vessels sensing the sonic responses at sea. These ships are fitted with a plurality of sonar sensing elements about the outside of the hull beneath the surface of the water. Each sonar element feeds electrical equipment within the ship in the conventional manner. In order to prevent erroneous signal indication and maximum power transfer, the plurality of sonar elements must be matched to the transmitter impedance and in good working order and to this end the impedance monitoring techniques described above are employed by breaking into the line or leads connected to each element from within the ship. Again, when a particular element is being tested, it cannot function and contribute to the operation of the system nor can a true picture of its characteristics under normal operation be obtained.

The present invention avoids the above problems and provides an improved impedance analyzer which can sense and determine with increased speed and accuracy the characteristics of the element under investigation without interrupting the lines and removing the element from operation with the system. The inventive analyzer can operate on either direct line energy sampling or the test signal transmission principle. Briefly stated, the invention provides an impedance analyzer which senses, for example, the operating line current and voltage by means of clamp-on current and voltage probes which do not break into nor interfere with the operating line conditions. Thus, the element under test is analyzed without interruption of its operating function. In the event a plurality of such elements are to be analyzed periodically, and repeatedly, probes can be provided on the lines of each element and signals therefrom can be applied to a multiplexer which then feeds the analyzer circuitry.

According to another feature of the invention, a new and improved technique and apparatus is provided for developing the impedance data on each electrical element tested. Briefly stated, the invention samples the test signal or operating line voltage and current. The current phase is adjusted so that the sampled voltage and current signal are in phase after which they are both fed to an analog divider which produces a signal indicative of absolute impedance magnitude. The divider output signal is then applied to a recorder or digital readout device. At the same time, the sampled voltage and current signal are fed to individual limiting or squaring amplifiers which commonly feed a phase comparator the output of which is applied to an integrator. The output voltage of the integrator corresponds to the magnitude of phase displacement of the sampled voltage and current. This signal is also either recorded or displayed so that the phase information can be determined. The sign of the phase signal is obtained from the aforementioned phase shifter circuit. Therefore, with the development of the absolute magnitude of impedance as well as the sign and magnitude of phase displacement, the analyzer produces all information necessary to determine the impedance characteristics of the line and/or the elements under test.

It is a primary object of the present invention to provide a dynamic impedance analyzer which provides the advantages and carries out the functions outlined above.

Other and further objects of the invention will become apparent with the following detailed description when taken in view of the appended drawings in which:

FIGURE 3 is a flow diagram of one type of phase shift arrangement that may be used in the invention.

DETAILED DESCRIPTION OF THE EMBODIMENTS

Figure 1:
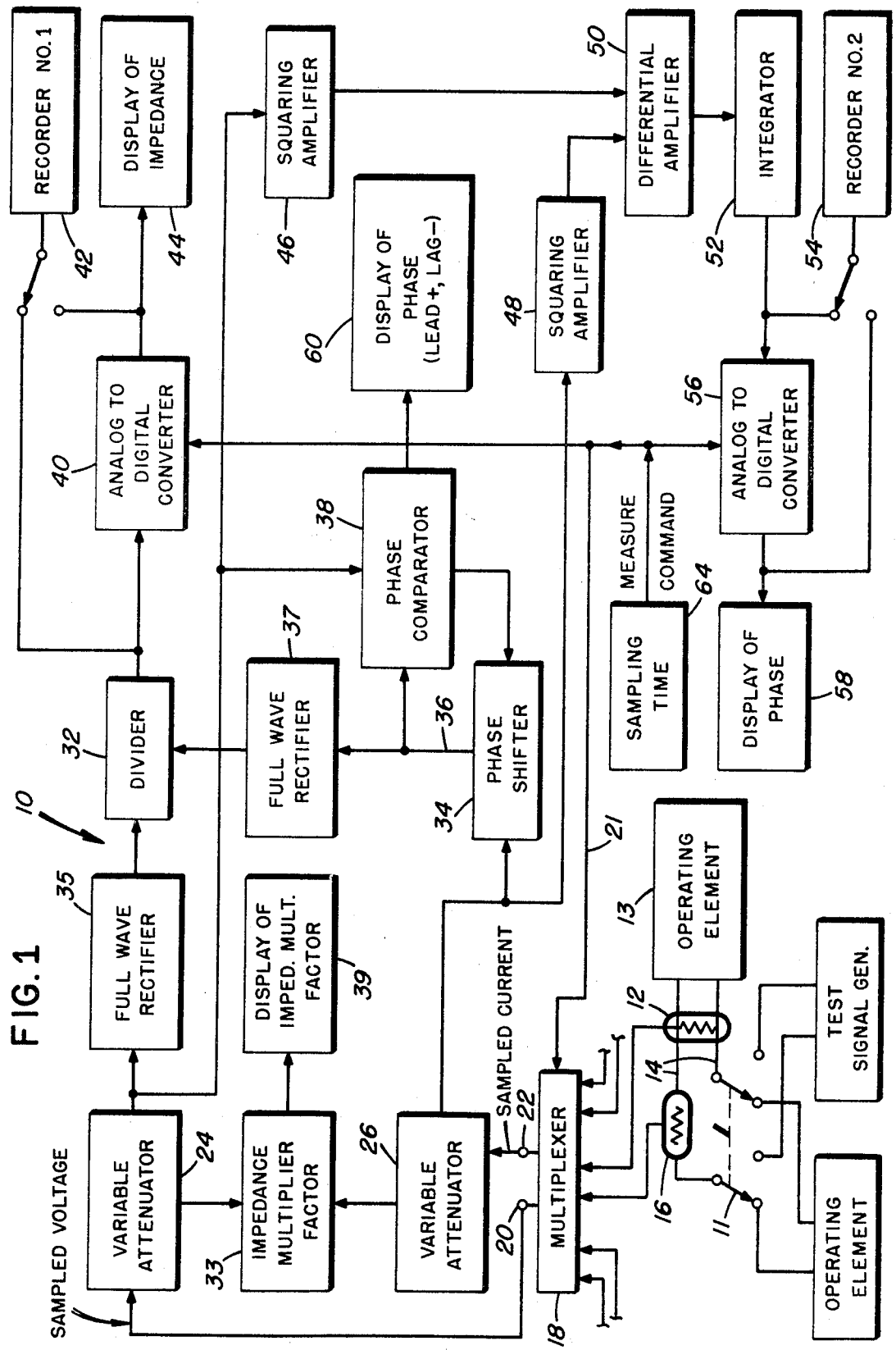
FIGURE 1 is a flow diagram of one example of the analyzer according to the invention.
Figure 2:
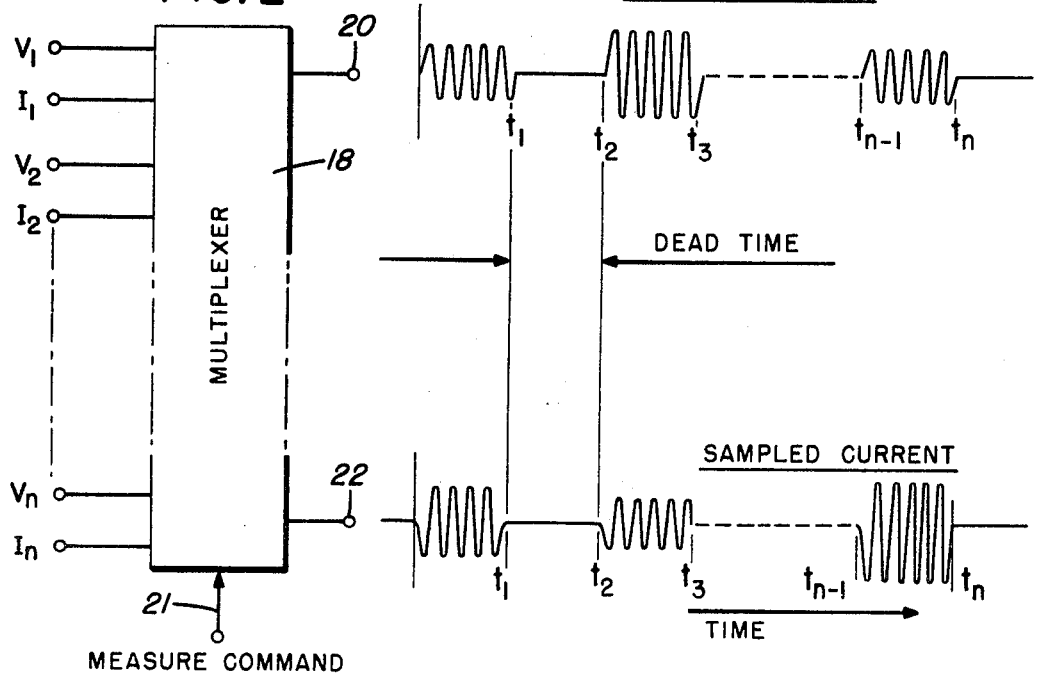
FIGURE 2 is a flow diagram of the multiplexer that can be used in the invention and the output signals developed thereby.

With reference to the drawings, one preferred dynamic impedance analyzer according to the invention and generally indicated as 10 is illustrated as being used in a system for monitoring the impedance characteristics of a plurality of operating elements. Operating or test signal line voltage and current are monitored depending upon the position of switches 11. In the illustrated embodiment, a clamp-on voltage probe 12 samples the alternating voltage across lines 14 connected to the operating element without interrupting the operation thereof. A clamp-on current probe (diagrammatically shown as 16) is coupled around one of the lines 14 and produces a voltage signal proportional to alternating current therethrough. This latter voltage signal will be herein referred to as the sampled current or current signal. Probes 12 and 16 apply the sampled signals to the inputs of a suitable multiplexer 18 which in addition may have input terminals connected to the corresponding leads of other like probes. Multiplexer 18 has two output terminals 20 and 22 upon which, in accordance with conventional multiplexer operation, there is periodically and repeatedly developed the sampled voltage and current signals respectively from associated probes 12 and 16. As described in further detail below, the multiplexer is conventionally controlled by measured command signals appearing on control line 21 such that each sampled burst includes a sufficient number of cycles for the following circuit to react and each burst is spaced from the preceding by a dead time to enable various circuit stages to reset. See FIGURE 2. Bursts of 100 cycles or less are normally sufficient for this purpose. One example of multiplexer 18 is the General Instrument Corporation, Microelectronics Division, MEM 2009 Analog Multiplexing Circuit, currently available on the market.

The dynamic impedance analyzer 10 receives the sampled voltage and current and develops the information signals necessary to determine the impedance characteristics of the line elements 13 or of the line itself. One example of analyzer 10 includes input attenuators 24 and 26 which receive the sampled voltage and current signals, respectively. These attenuators serve to prevent overload of the measurement circuitry described hereinbelow and to set the analyzed signals at a suitable range or scale. Attenuators 24 and 26, being standard pieces of electronic equipment, are variable and may be adjusted automatically or manually depending upon the requirements of the system. Attenuators 24 and 26 have auxiliary outputs 28 and 30 which control a multiplier circuit 33 representative of the impedance multiplication factor or scale. Multiplier 33 is automatically adjusted for any setting of either voltage or current attenuator settings. The multiplier circuit 33 controls a visual display device 39 so that the operator knows the true scale of the output of the analyzer.

As mentioned above, the inventive analyzer develops a signal proportional to the instantaneous absolute magnitude of the line impedance and this is accomplished by providing an analog divider 32 which receives the rectified sampled voltage from full wave rectifier 35 coupled to attenuator 24 and divides the same by the value of the rectified sampled current signal received from full wave rectifier 37 coupled to attenuator 26. One suitable example of divider 32 is the Burr Brown Company, Analog Divider, Model 1671. However, in order to achieve absolute value indication, the sampled signals, which have the same frequency, are adjusted to zero phase displacement before reaching the divider. To this end, with the voltage phase defined as the reference, the sampled current signal is first fed to a phase shifter 34 which rapidly and continuously adjusts the phase of the current on line 36. Phase shifter 34 is controlled by a phase comparator 38 which has its inputs coupled to receive the sampled voltage and the output line 36 of phase shifter 34. In this way, the phase comparator 38 senses the signals to each input of the analog divider 32 and controls phase shifter 34 to shift the current signal phase in lead or lag so that the sampled current signal arriving at the divider is in phase with the sampled voltage. When the inputs to analog divider 32 are in phase, phase comparator applies a steady state control signal to phase shifter 34 and the current signal phase on line 36 remains fixed.

Figure 4:
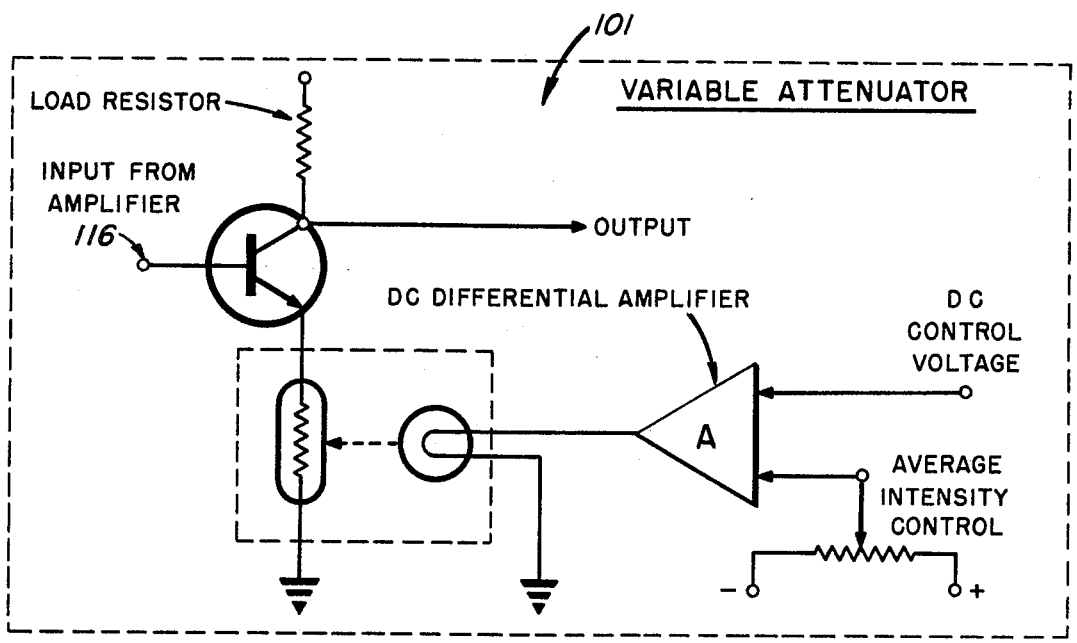
FIGURE 4 is a flow diagram of one example of a variable attenuator that can be used in the present invention.

An example of the phase shifter and comparator design is illustrated in FIGURE 3. The incoming sampled current is transformer coupled to a conventional phase shift network 100 including a photo resistor 102 to vary the phase of the output signal at line 36. The comparator 38 includes a D.C. differential amplifier 106 operating an incandescent lamp 108 the average brightness of which is set by potentiometer 110. Comparator 38 also includes a differential amplifier 112 receiving sampled voltage and current signals from amplifiers 114 and 116, the latter of which is coupled to line 36. In order for the output of amplifier 112 to be representative of the phase deviation of the signals received, a variable attenuator 101 automatically adjusts the amplitude of the current signal from amplifier 116 so as to equal the amplitude of the signal from amplifier 114. See FIGURE 4 for one example of attenuator 101 which includes a transistor amplifier the gain of which is adjusted by the control voltage. Control for attenuator 101 is provided by differential amplifier 103 operating off the outputs of full wave rectifier and low phase filter stages 105 and 107 which tap the outputs of amplifiers 114 and 116. Amplifier 112 controls peak detector 118 which controls amplifier 106. For further description of the phase comparator as well as other suitable examples, see Control Engineering, "Six Ways To Measure Phase Angle," by Robert Staffin, October 1965.

As can be seen, comparator 38 forms a feedback loop such that detector 118 develops a varying plus or minus D.C. until a steady state or balanced condition is established, i.e., until the phase of the current signal at line 36 matches that of the sampled voltage. When this condition occurs, the D.C. output of detector 118 remains fixed. The sign (plus or minus) representative of lead or lag is obtained from the output of detector 118 which is applied to display device 60. It will be appreciated that if one phase shift network is not sufficient to achieve a great enough phase shift, several such phase shifters may be cascaded in the conventional manner. Normally, at least two phase shifters may be necessary to achieve a shift of ±90° from a defined zero value.

The output of analog divider 32 which is representative of instantaneous V absolute/I absolute may be fed to an analog-digital converter 40 or alternately to a suitable recorder 42. If recorder 42 is of the digital control type, it may be connected to the output of converter 40. Converter 40 also feeds a numeric visual display device 44 so that the value of V/I absolute can be observed.

The dynamic impedance analyzer 10 also performs an impedance discriminating function by providing squaring or limiting amplifiers 46 and 48 which receive the sampled voltage and current from attenuators 24 and 26. The outputs of amplifiers 46 and 48 are in the form of square waves having constant pulse heights and instantaneous equal pulse widths. The outputs of amplifiers 46 and 48 are connected to differential amplifier 50 normally biased at cut-off which produces at its output a square wave of constant amplitude and having a pulse width proportional to the phase difference between the sampled voltage and the sampled current. Since differential amplifier 50 is biased at cut-off, the output pulses thereof will be of only one sign or polarity. Thus, if the sampled voltage and sampled current at terminals 20 and 22 are in phase, the output of differential amplifier 50 is zero. If the sampled signals are out of phase, differential amplifier 50 develops pulse with widths related to the phase difference. An integrator 52 is coupled to receive the output of differential amplifier 50 and produces a D.C. output signal having an amplitude corresponding to the magnitude of the sampled voltage-current phase difference. The output of integrator 52 can also be applied to a recorder 54 and to an analog-to-digital converter 56. If recorder 54 is of the digital type, its input can be taken from the output of converter 56. A visual display unit 58 receives the output of converter 56 so that the value of phase can be determined. It should be understood that the output of integrator 52 is representative of the magnitude of phase only and does not indicate the sign or direction (lead or lag) of the phase. For this reason, a phase visual readout circuit 60 controlled by an auxiliary output 62 of the phase shifter 34 indicates the plus or minus (lead or lag) nature of the phase.

In the event sampling or monitoring is to be discontinuous, a sampling time control circuit, which is either automatic or manually operated, feeds an "operate" command signal to the converters 40 and 56.

In operation, whenever a sampling command emanates from the sampling control circuit 64, the sampled voltage and current signal are adjusted to zero phase difference and fed to analog divider 32 which produces a signal representative of instantaneous V/I absolute and feeds the same through analog-to-digital converter 40 to the visual readout device 44. This signal may also be recorded by recorder 42. At the same time, the sampled voltage and current signal are changed into a train of constant amplitude square wave pulses by amplifiers 46 and 48 and fed to a differential amplifier 50 which develops a single polarity, square wave pulse train having pulse widths proportional to the phase difference between the sampled voltage and sampled current signal. The output of amplifier 50 is integrated to provide a D.C. signal with which a visual display is produced representative of the sampled current-voltage phase displacement. This value may also be recorded on recorder 54 either in digital or analog form. An additional readout device 60 controlled by the phase comparator auxiliary output indicates the phase lag or lead of the phase displacement appearing on visual display device 58.

In this way, and with this information, the impedance characteristic on the lines 14 or of operating element 13 can be determined by comparing the information obtained with predetermined standards so that the operator can quickly determine the status or condition of the line, electrical components or the like. Additional uses of the invention include monitoring the condition of loud speakers and other acoustic elements. It should be understood that various modifications can be made to the herein-disclosed example of the present invention without departing from the spirit or scope thereof.

What is claimed is:

1. A dynamic impedance analyzer for rapidly indicating impedance characteristics of line conditions, electrical elements, or the like, comprising first means for developing a sampled voltage signal of one frequency, second means for developing a sampled current signal of equal frequency, the signals being representative of the voltage and current associated with said impedance, divider means having a sampled voltage input coupled to said first means and a sampled current input coupled to said second means for dividing the sampled voltage signal by the sampled current signal and producing a signal proportionate thereto, phase shifting means for sensing the phase difference between the sampled current and voltage signals and shifting the phase of one of the current and voltage signals such that the sampled current and voltage signals arrive at the divider means inputs in phase, first indicating means coupled to receive the divider means output signal for displaying the impedance value thereof, and phase discriminating means coupled to receive the sampled current and voltage signals from said first and second means for developing a signal corresponding to the phase difference therebetween, and second indicating means coupled to receive the output from said phase discriminating means for displaying the phase value thereof.

2. An analyzer as set forth in claim 1 wherein said first means includes a clamp-on voltage sampling probe and said second means includes a clamp-on current sampling probe.

3. An analyzer as set forth in claim 1 wherein said phase shifting means includes a phase shifter coupled between one of said first and second means and the respective voltage or current input of said divider means and phase sensing means comparing the phase of the phase shifter output signal with that of the sampled voltage signal and developing a phase shifter control signal corresponding to the phase difference and feeding the same to the phase shifter for changing the phase of the output signal thereof.

4. An analyzer as set forth in claim 3 wherein said sensing means includes a differential amplifier controlling a peak detector and means for equalizing the amplitudes of the sampled current and voltage signals reaching the input of the differential amplifier, a second differential amplifier having one input connected to an average control voltage source and the other connected to receive the output of the peak detector, the output of the second differential amplifier connected to control the phase shifter.

5. An analyzer as set forth in claim 1 wherein said phase discriminator includes a pair of squaring means each having its input coupled to receive opposite ones of the sampled voltage and current signals for developing a train of constant amplitude square wave pulses with the same frequency as the received sampled signal, and comparing means receiving the pulse trains and developing a D.C. signal proportional to the absolute phase difference between the sampled signals.

6. An analyzer as set forth in claim 5 wherein said last-mentioned means includes a differential amplifier biased near cut-off receiving the pulse trains and an integrator receiving the output of the differential amplifier.

7. An analyzer as set forth in claim 1 wherein an indicating device is coupled to the phase shifting means for indicating the sign of the phase difference between the sampled signals.

8. An analyzer as set forth in claim 1 wherein analog-to-digital converter means are coupled to receive the signals from the divider means and phase discriminator means and feed digital signals to the first and second indicating means respectively, and sampling time means for generating "on" command signals and feeding the same to the converter means for enabling the same at predetermined times.

9. An analyzer as set forth in claim 1 wherein said first means includes a plurality of voltage probes and a single voltage output terminal, said second means includes a plurality of current probes and a single current output terminal each current probe associated with one of said voltage probes, and means sequentially coupling associated pairs of voltage and current probes to the respective voltage and current output terminals.

10. An analyzer as set forth in claim 1 wherein each said first and second means include variable attenuators which develop the output thereof and an auxiliary signal indicative of the attenuator setting, third indicating means receiving each auxiliary signal and displaying a value indicative of the multiplication factor associated with the display value of said first indicating means.

References Cited

UNITED STATES PATENTS

| 3,090,913 | 5/1963 | Boyer | 324—57 |
| 3,230,449 | 1/1966 | Kaiser | 324—60 |

EDWARD E. KUBASIEWICZ, Primary Examiner

U.S. Cl. X.R.

324—82